United States Patent
Nakajima et al.

(10) Patent No.: US 7,867,126 B2
(45) Date of Patent: Jan. 11, 2011

(54) DIFFERENTIAL CASE FOR VEHICLE AND DIFFERENTIAL DEVICE FOR VEHICLE

(75) Inventors: Shinichiro Nakajima, Niiza (JP); Rei Nakayama, Iruma (JP)

(73) Assignee: JTEKT Corporation, Osaka-shi (JP)

( * ) Notice: Subject to any disclaimer, the term of this patent is extended or adjusted under 35 U.S.C. 154(b) by 613 days.

(21) Appl. No.: 11/846,138

(22) Filed: Aug. 28, 2007

(65) Prior Publication Data

US 2008/0051245 A1    Feb. 28, 2008

(30) Foreign Application Priority Data

Aug. 28, 2006  (JP)  ............... 2006-230606
Aug. 28, 2006  (JP)  ............... 2006-230705
Aug. 28, 2006  (JP)  ............... 2006-231098

(51) Int. Cl.
    F16H 57/04    (2010.01)
(52) U.S. Cl. .................. 475/160; 475/230
(58) Field of Classification Search ............ 475/159, 475/160, 230
    See application file for complete search history.

(56) References Cited

U.S. PATENT DOCUMENTS 5,556,351 A * 9/1996 Hiraishi et al. ............. 475/160
6,299,561 B1 * 10/2001 Kramer et al. ............. 475/160
7,025,702 B2 * 4/2006 Saito et al. ................. 475/160
7,160,219 B2 * 1/2007 Oates ......................... 475/160

FOREIGN PATENT DOCUMENTS

| JP | 8-320057   | 12/1996 |
| JP | 9-079349   | 3/1997  |
| JP | 2006-46642 | 2/2006  |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

A differential case for a vehicle and a differential device for a vehicle supplying sufficiently lubrication oil to a gear peripheral portion as a supported portion of a pinion gear in order to prevent a bonding of the gear peripheral portion of the pinion gear. The differential case or the differential device for the vehicle comprises a pair of pinion gear supporting portions (10, 11) supporting slidably a pair of pinion gears (3, 4), and a lubrication oil introducing portion (7, 8) provided around a peripheral portion of the pair of pinion gears (3, 4) to introduce lubrication oil into a clearance between sliding faces of the pair of pinion gears (3, 4) and pinion gear supporting faces (10a, 11a, 10b, 11b) of the pair of pinion gear supporting portions (10, 11).

18 Claims, 13 Drawing Sheets

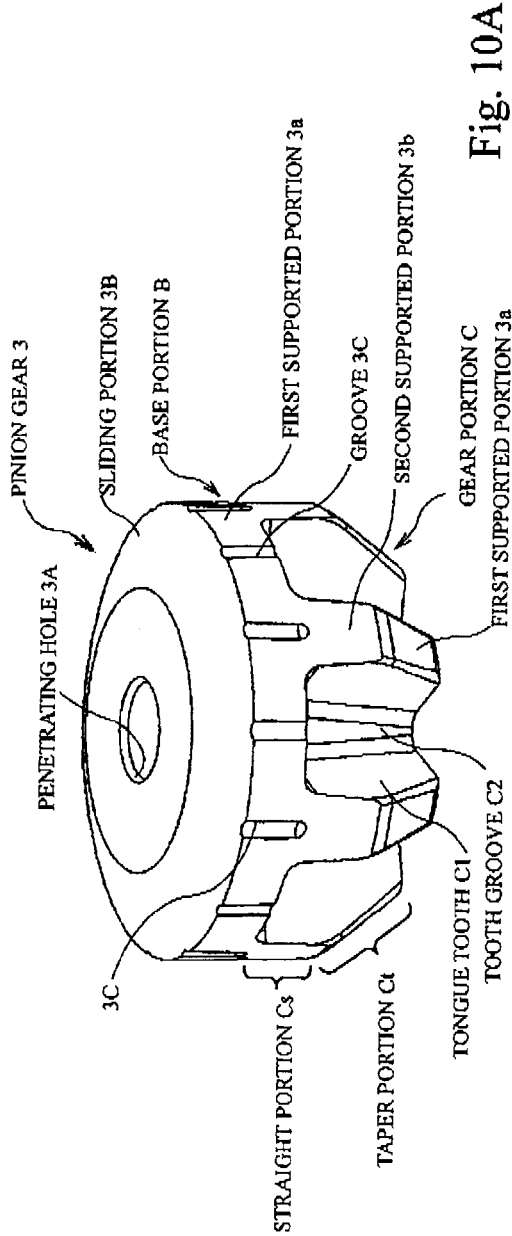
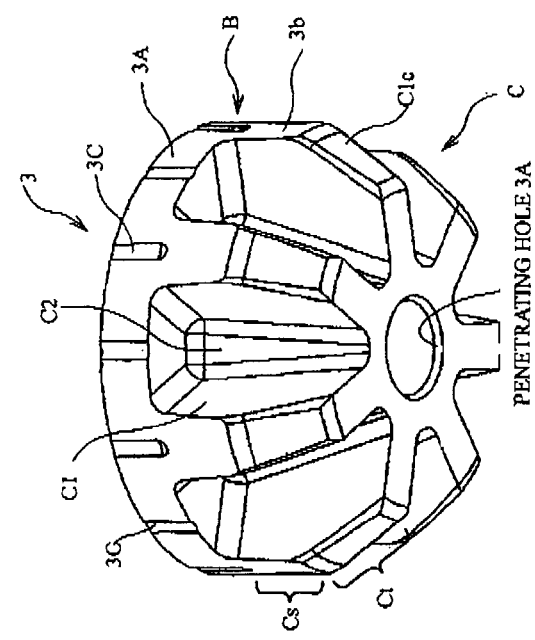
Fig. 10A
Fig. 10B

DIFFERENTIAL CASE FOR VEHICLE AND DIFFERENTIAL DEVICE FOR VEHICLE

INCORPORATION BY REFERENCE

The present application claims priority under 35 U.S.C. §119 to Japanese Patent Applications No. 2006-230606, filed on Aug. 28, 2006, No. 2006-230705, filed on Aug. 28, 2006 and No. 2006-231098, filed on Aug. 28, 2006. The contents of these applications are incorporated herein by reference in their entirety.

BACKGROUND OF THE INVENTION

1. Field of the Invention

The present invention relates to a differential case for a vehicle and a differential device for a vehicle, and more particularly relates to a differential case for a vehicle and a differential device for a vehicle having plural pinion gear supporting portion supporting slidably plural pinion gears being a shaft-less type.

2. Description of the Related Art

It is well known for a prior differential device for a vehicle to provide a pair of shaft-less pinion gears as disclosed in a published patent document; Tokkai 2006-46642.

The differential device for the vehicle comprises a pair of pinion gears, a pair of side gears engaging with the pair of pinion gears, a differential case rotatably mounting the pair of pinion gears and the pair of side gears.

The pair of pinion gears has a gear peripheral portion as a supported portion over all around periphery and a gear engaging portion engaging with the pair of side gears and the pair of pinion gears are disposed in the differential case on an axis perpendicular to a rotational axis of the differential case. An inside face of the pair of side gears is connected with right and left tire shafts in a spline engagement. In the differential case is mounted a pinion gear penetrating hole having a first pinion gear supporting face to support slidably the gear peripheral portion of the pair of pinion gears. Around of an inner opening of the pinion gear penetrating hole is mounted an extending portion having a second pinion gear supporting portion to support slidably a part of the gear engaging portion of the pinion gears.

Based on the above-mentioned construction, when torque from an engine is input into the differential case through a driving pinion and a ring gear, the differential case is rotated around the rotational axis. At the rotation of the differential case, the rotational force is transmitted to the pair of pinion gears and the pair of side gears through the pair of pinion gears. Therefore, the torque is distributed and transmitted differentially to right and left tire shafts according to a running condition of the vehicle since the pair of side gears engages with right and left tire shafts in the spline engagement.

In running of the vehicle, where the vehicle turns in a stage to transmit large torque to the differential case, the pinion gears slide in a stage to be pushed on the first pinion gear supporting face of the pinion gear penetrating hole and the second pinion gear supporting face of the extending portion. At this moment, a part of frictional heat generating between the sliding surface of the pinion gear and the first pinion gear supporting face of the pinion gear penetrating hole and also between the sliding surface of the pinion gear and the second pinion gear supporting face of the extending portion is cooled by lubrication oil supplied to a clearance between the sliding surface of the pinion gear and the first pinion gear supporting face of the pinion gear penetrating hole and also between the sliding surface of the pinion gear and the second pinion gear supporting face of the extending portion. Therefore, the well known differential device for the vehicle disclosed in the published patent document lubricates between the sliding surface of the pinion gear and the first pinion gear supporting face of the pinion gear penetrating hole and also between the sliding surface of the pinion gear and the second pinion gear supporting face of the extending portion and it discharge frictional heat by the way of movement of lubrication oil by the rotation of the differential case.

However, in the well known differential device for the vehicle disclosed in the published patent document, there is the problem that lubrication oil is not supplied sufficiently around the gear peripheral portion as the supporting portion of the pinion gear to cause the gear peripheral portion of the pinion gears to be bonded in burn. This is happened more in large diameter of the pinion gears.

SUMMARY OF THE INVENTION

In view of the previously mentioned circumstances, it is an object of the present invention to provide a differential case for a vehicle and a differential device for a vehicle supplying sufficiently lubrication oil to a gear peripheral portion as a supported portion of a pinion gear in order to prevent a bonding of the gear peripheral portion of the pinion gear.

In order to achieve the above and other objects, one aspect of the present invention provides a differential case for a vehicle having plural pinion gear supporting portions supporting slidably plural pinion gears, and a lubrication oil introducing portion provided around a peripheral portion of the plural pinion gears to introduce lubrication oil into a clearance between sliding faces of the plural pinion gears and pinion gear supporting faces of the plural pinion gear supporting portions.

Second aspect of the present invention provides a differential device for a vehicle having mainly plural pinion gear supporting portions supporting slidably plural pinion gears, and a lubrication oil introducing portion provided around a peripheral portion of the plural pinion gears to introduce lubrication oil into a clearance between sliding faces of the plural pinion gears and pinion gear supporting faces of the plural pinion gear supporting portions.

Thereby, the present invention can supply sufficiently lubrication oil to the plural pinion gear peripheral portions as a supported portion of the plural pinion gears in order to prevent a bonding of the plural pinion gear peripheral portions of the plural pinion gears.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 10A and 10B are an oblique perspective diagram explaining a pinion gear of a differential device for a vehicle according to one embodiment of the present invention;

DETAILED DESCRIPTION OF THE PREFERRED EMBODIMENTS

Whole Construction of the Differential Device for the Vehicle

Figure 1:
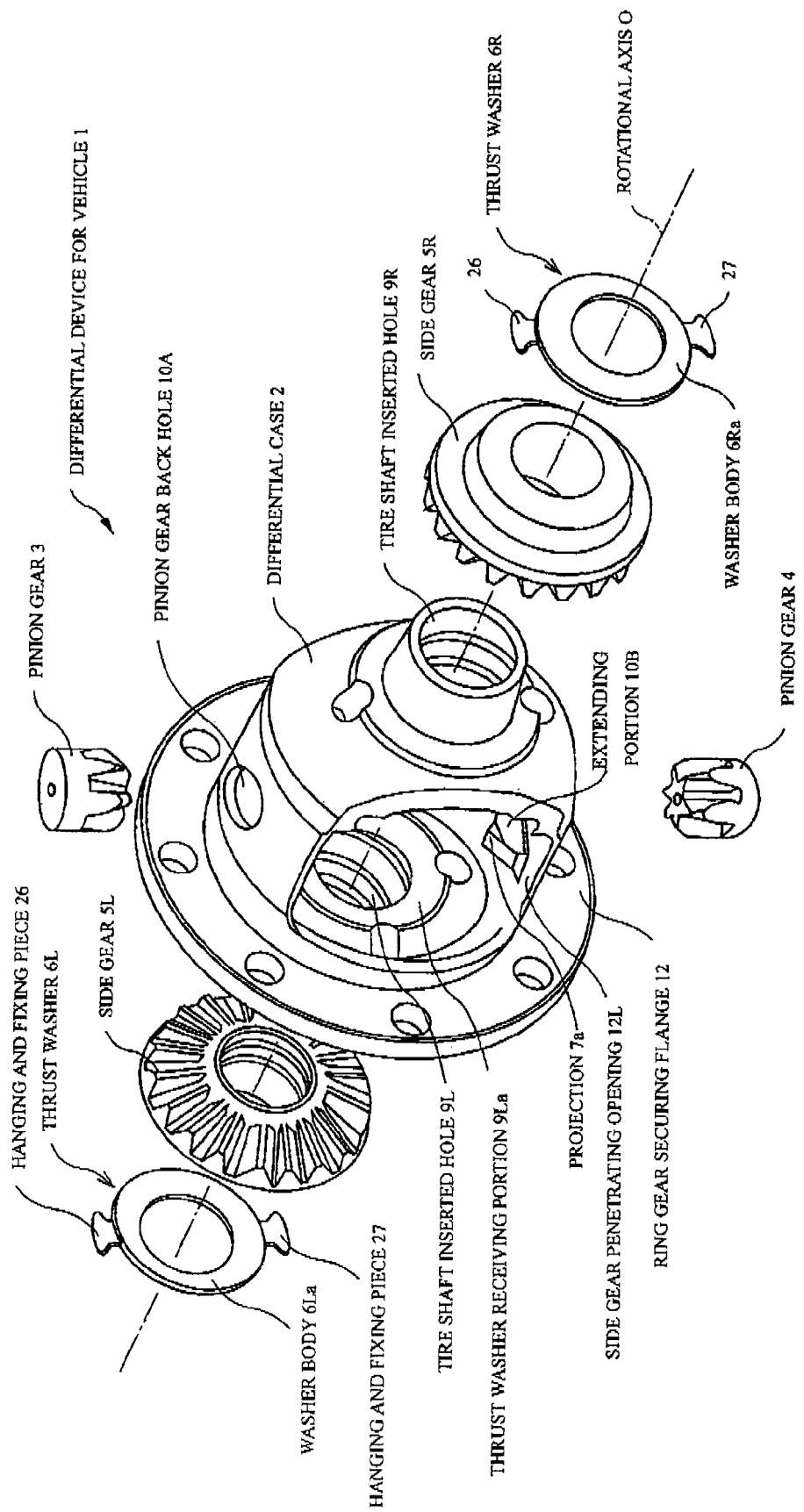
FIG. 1 is an oblique perspective diagram explaining a differential device for a vehicle according to one embodiment of the present invention.
Figure 2:
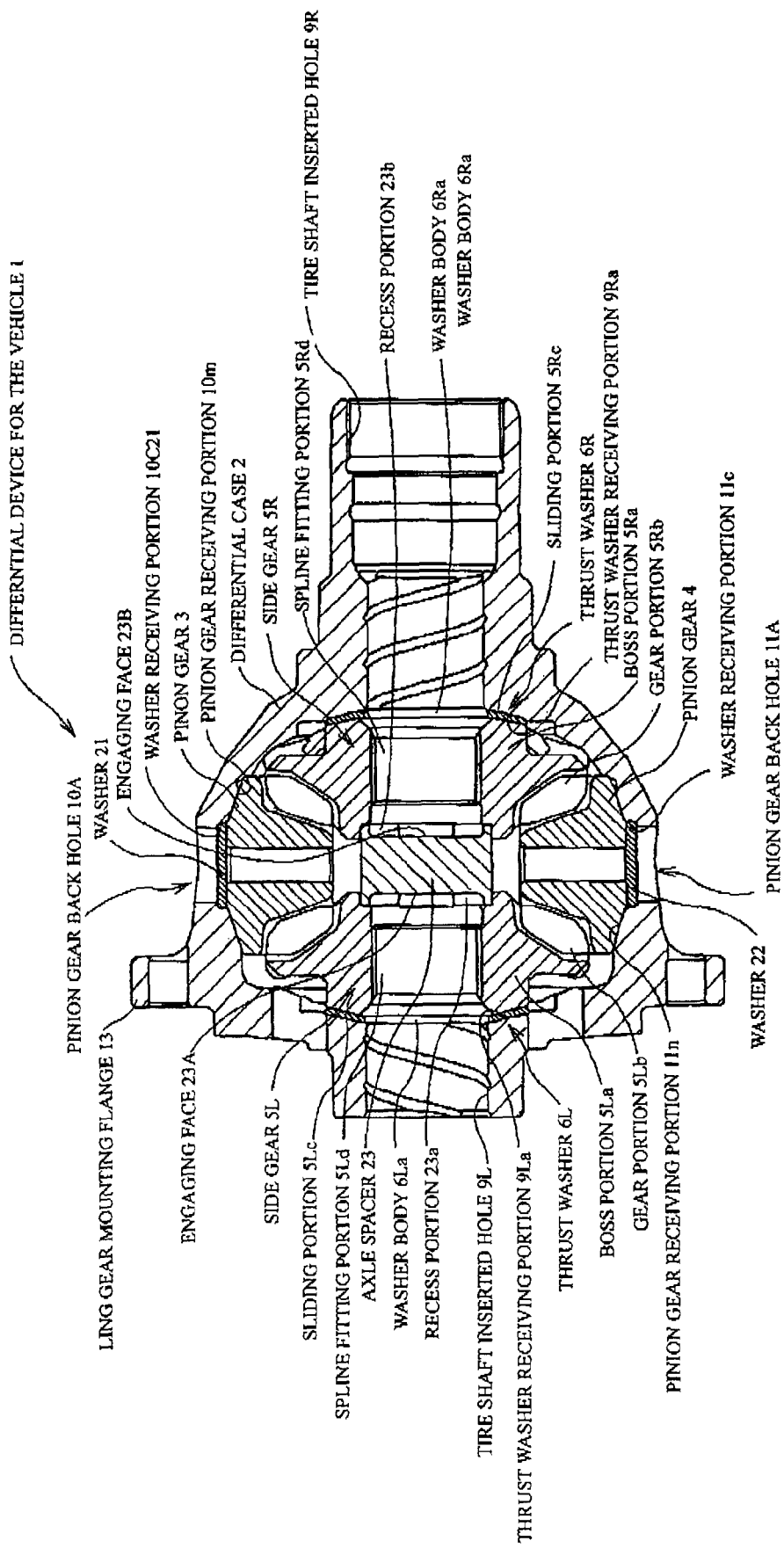
FIG. 2 is a vertically sectional drawing explaining a differential device for a vehicle according to one embodiment of the present invention.
Figure 3:
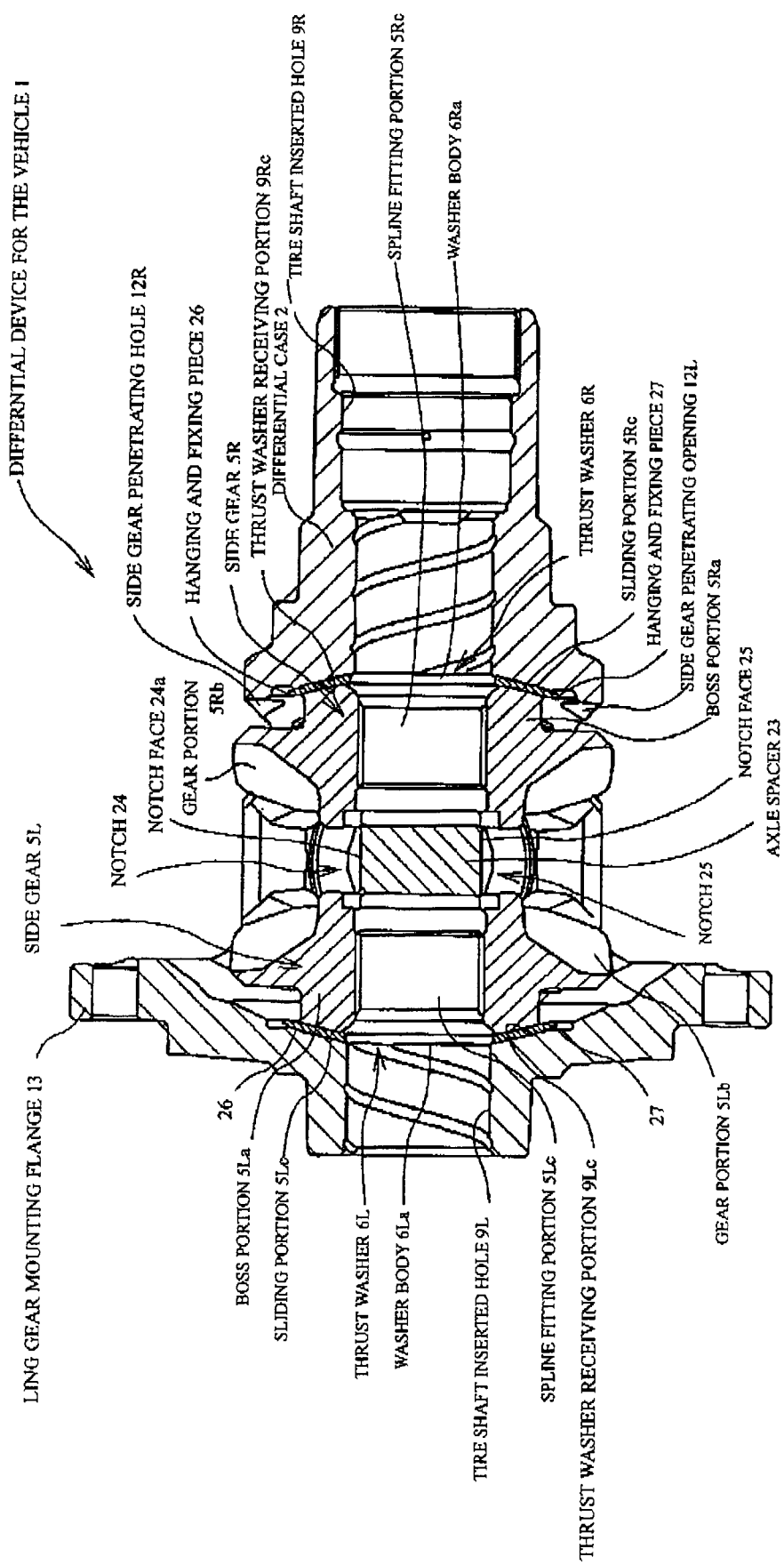
FIG. 3 is a horizontally sectional drawing explaining a differential device for a vehicle according to one embodiment of the present invention.

In FIG. 1 to FIG. 3, a numeral 1 shows the differential device for the vehicle. The differential device 1 mainly constitutes of a differential case 2, two pinion gears 3, 4, two side gears 5L, 5R and two thrust washers 6L, 6R. The differential case 2 is rotated by receiving a torque from an engine. The pinion gears 3, 4 are aligned in parallel in upper and down positions along a perpendicular line to a rotational axis O (referred to FIG. 6) of the differential case 2. The pinion gears 3, 4 engage with the side gears 5L, 5R and the thrust washers 6L, 6R are positioned on back sides of the side gears 5L, 5R.

[Construction of the Differential Case 2]

Figure 5:
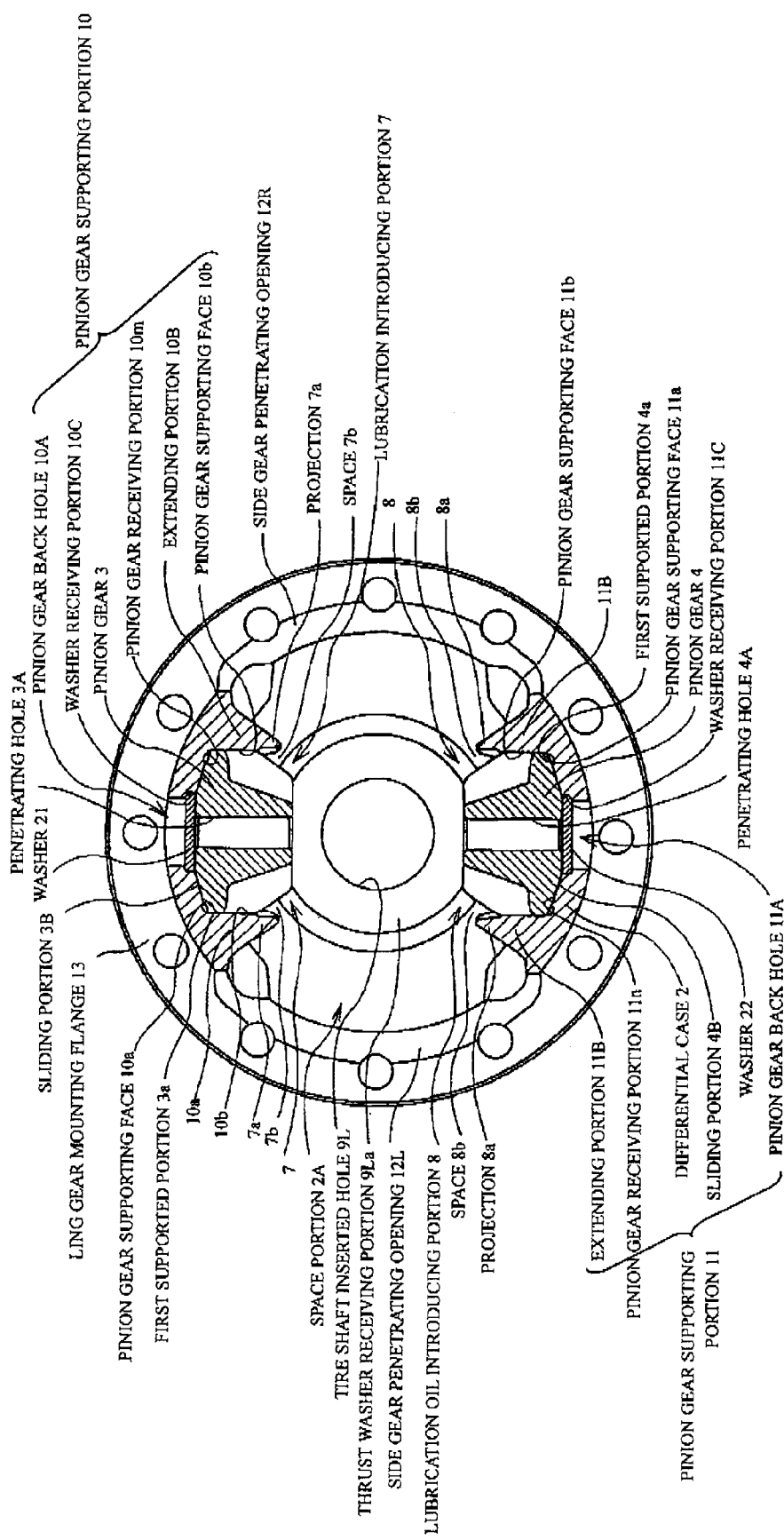
FIG. 5 is a cross sectional drawing cut in perpendicular to a rotational axis of a differential case to show an assembling stage of pinion gears of a differential device for a vehicle according to one embodiment of the present invention.
Figure 6:
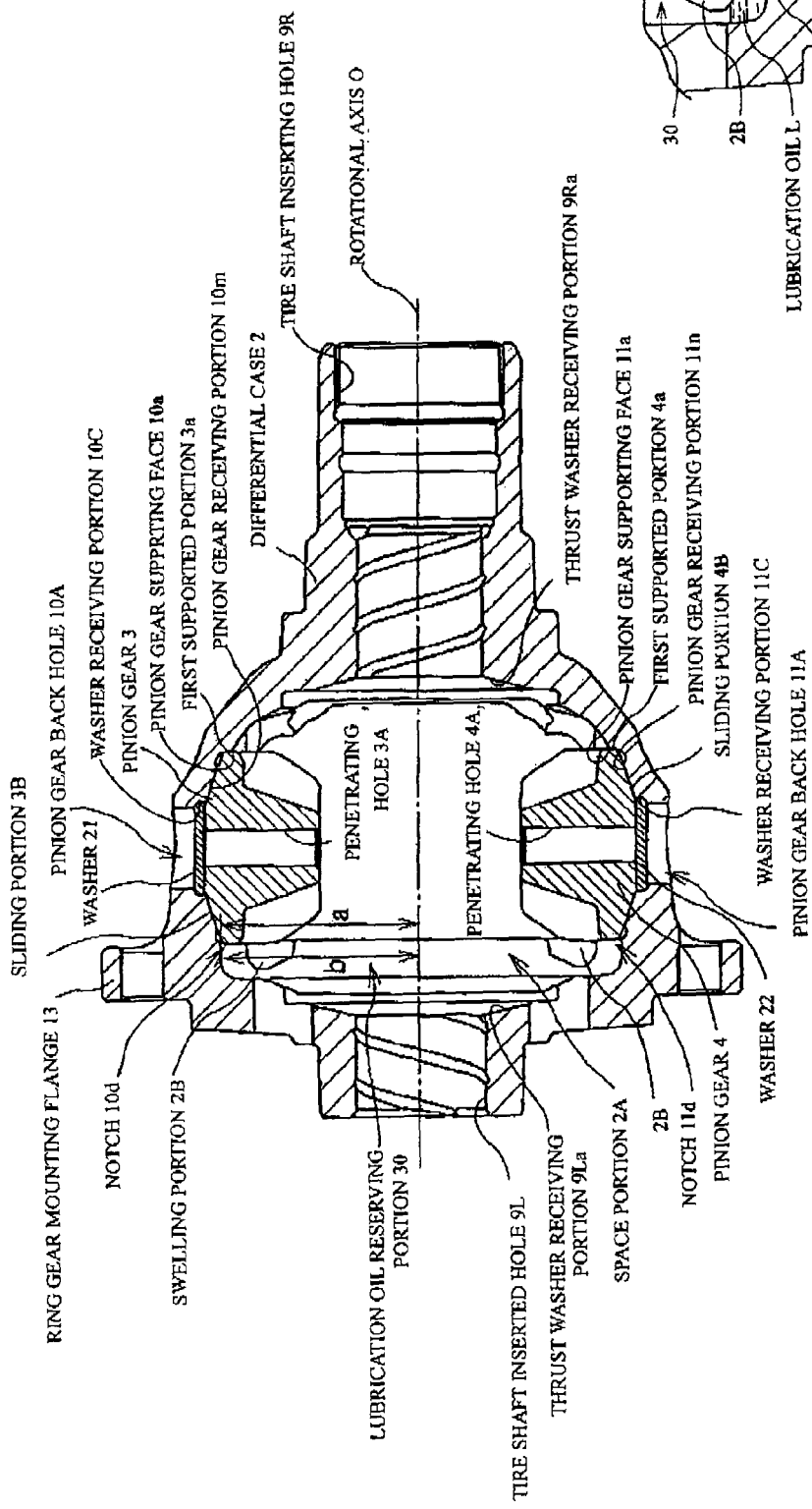
FIGS. 6A and 6B are a cross sectional drawing cut in parallel to a rotational axis of a differential case to show an assembling stage of pinion gears of a differential device for a vehicle according to one embodiment of the present invention.

As shown in FIGS. 2, 5 and 6, the differential case 2 has a space portion 2A, a swelling portion 2B, lubrication oil introducing portions 7, 8 and a lubrication oil reserving portion 30. The space 2A installs the pinion gears 3, 4, the side gears 5L, 5R and the thrust washers 6L, 6R. The swelling portion 2B communicates with the space portion 2A. The lubrication oil introducing portions 7, 8 introduces lubrication oil to a clearance between a sliding face of the pinion gears 3, 4 and to a pinion gear supporting face of pinion gear supporting portions 10, 11. The sliding portions of the pinion gears 3, 4 are first supported portions 3a, 4a of a base portion B and second supported portions 3b, 4b of a gear portion C as described hereinafter. The pinion gear supporting faces are pinion gear supporting faces 10a, 11a of pinion gear back holes 10A, 11A and pinion gear supporting faces 10b, 11b of extending portions 10B, 11B. The lubrication oil reserving portion 30 introduces lubrication oil to the sliding face of the pinion gears 3, 4. All of the above component members are constructed as one peace.

As shown in FIG. 5, the lubrication oil introducing portions 7, 8 is constructed with the pinion gears 3, 4 and projections 7a, 8a mixing up lubrication oil which is consisted of differential oil. As shown in FIGS. 1, 4, 7, 8, the projections 7a, 8a project over the pinion gear supporting faces 10b, 11b in the extending portions 10B, 11B toward the rotational axis O of the differential case 2 in a whole body with the extending portions 10B, 11B, and total number of projections 7a, 8a is four and each two projections 7a or 8a are provided on both sides of pinion gears 3 or 4 in a rotational direction of the differential case 2. Spaces 7b, 8b are formed by the projections 7a, 8a and the pinion gears 3, 4 to open to the rotational axis O and the sides of pinion gear supporting portions 10, 11 to the rotational axis O in order to introduce lubrication oil.

Figure 9:
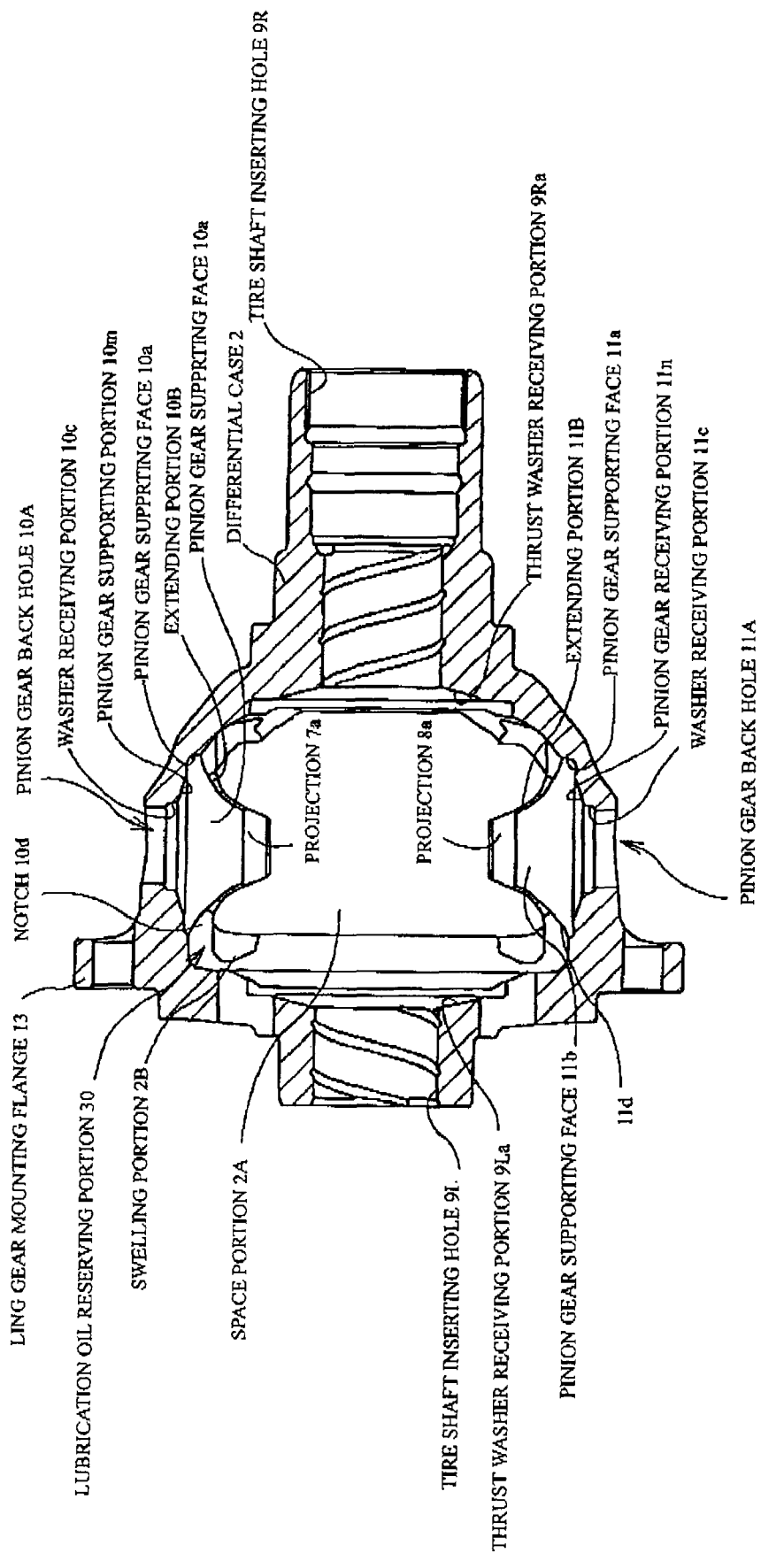
FIG. 9 is a cross sectional drawing explaining a lubrication oil reserving portion of a differential case of a differential device for a vehicle according to one embodiment of the present invention.
Figure 13:
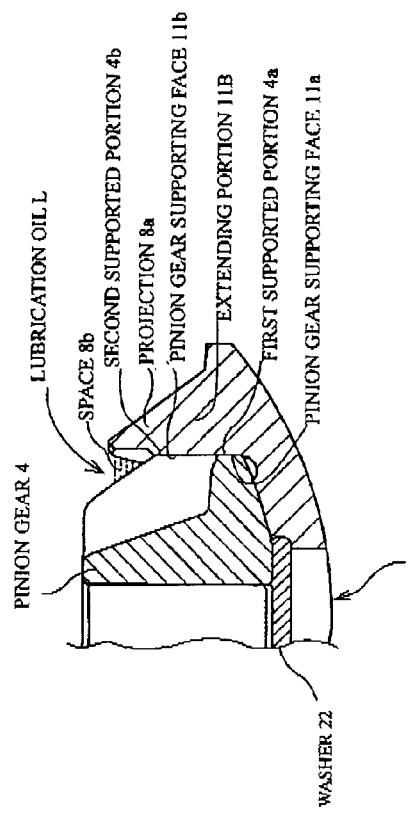
FIG. 13 is a cross sectional drawing showing an operation of supplying lubrication oil of a differential device for a vehicle according to one embodiment of the present invention.

As shown in FIGS. 6, 9, the lubrication oil reserving portion 30 is formed as a circular recess on all peripheral inner surface of the differential case 2 around the rotational axis O to reserve lubrication oil L therein, especially the lubrication oil reserving portion 30 is disposed in a position to introduce lubrication oil L reserved in the lubrication oil reserving portion 30 to a part of the first supported portion 3a, 4a in a sliding surface of the pinion gear 3, 4. Said position is a position where a length "a" equals approximately a length "b", where the length "a" is a distance between the rotational axis O and the first supported portion 3a or 3b and the length "b" is a distance between the rotational axis O and the lubrication oil reserving portion 30. The lubrication oil L is kept to stay in the lubrication oil reserving portion 30 by centrifugal force caused by the rotation of differential case 2 as shown in FIG. 13. Thereby, the lubrication oil L is supplied to the first supported portions 3a, 4a of the pinion gears 3, 4. Since stress generated in a root of the pinion gear supporting portion 10, 11 is scattered in the lubrication oil reserving portion 30, the differential case 2 is strengthened in mechanism.

Figure 7:
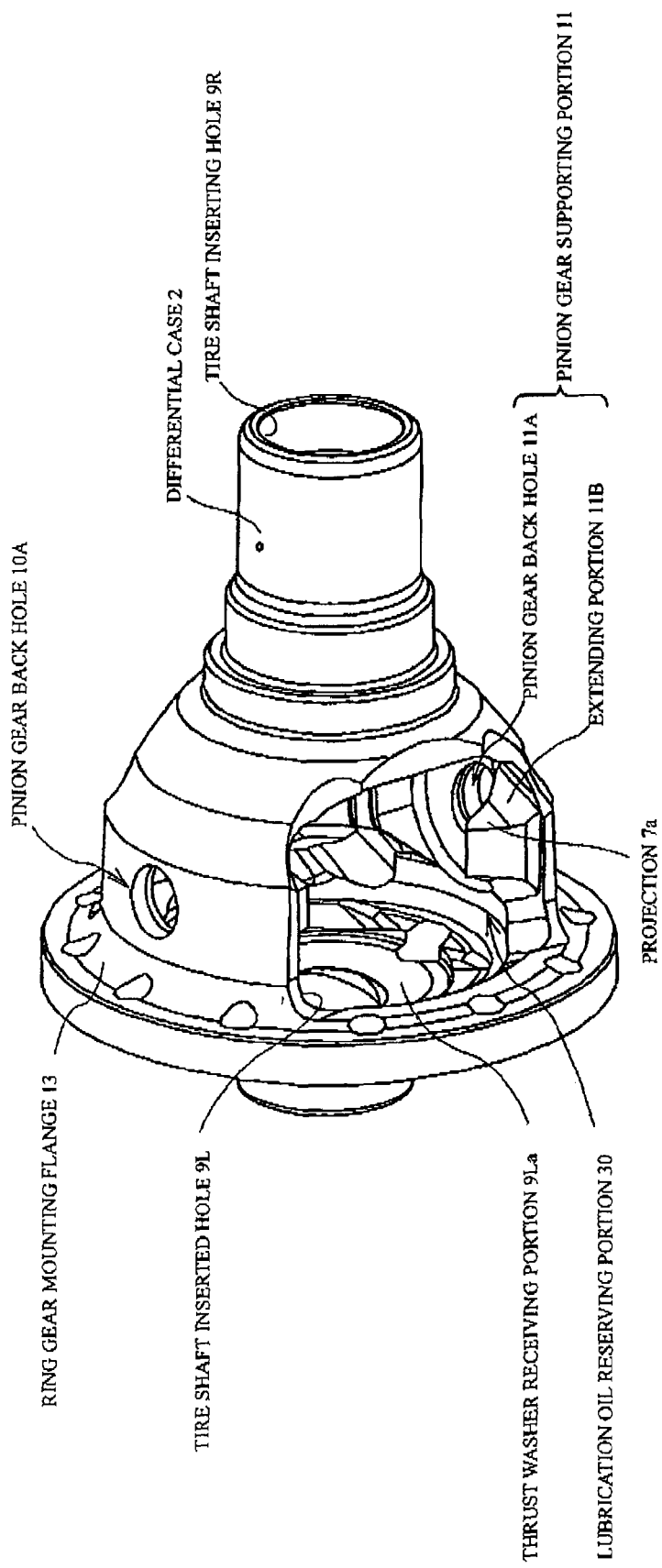
FIG. 7 is an oblique perspective diagram showing a differential case of a differential device for a vehicle according to one embodiment of the present invention.
Figure 8:
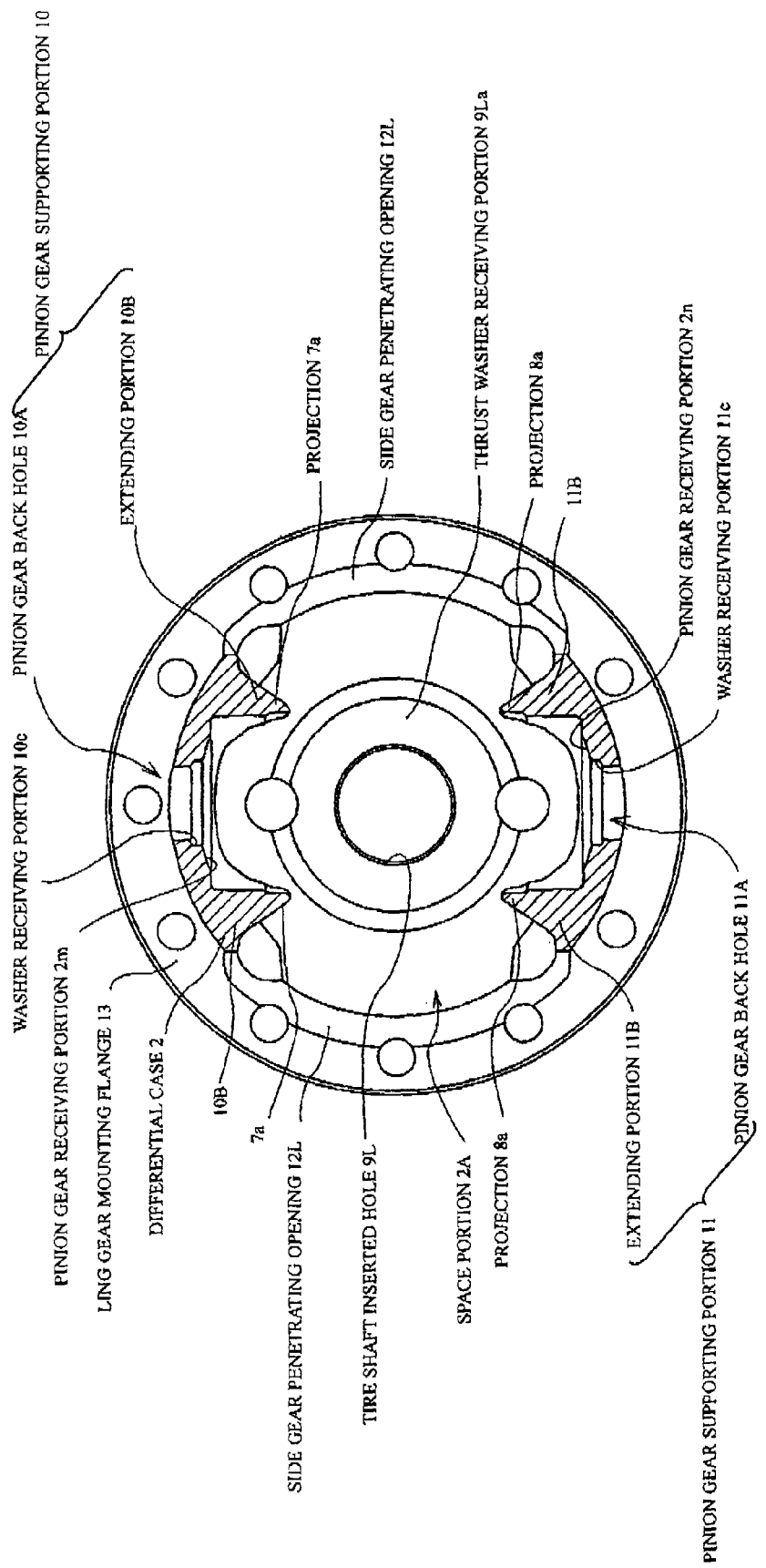
FIG. 8 is a cross sectional drawing explaining a lubrication oil introducing portion of a differential case of a differential device for a vehicle according to one embodiment of the present invention.

In the differential case 2, as shown in FIGS. 2, 5, it is provided that two right and left tire shaft inserted holes 9L, 9R are opened along the rotational axis O and one pair of the pinion gear supporting portions 10, 11 are positioned in upper and lower position in perpendicular to an axis of the tire shaft inserted holes 9L, 9R. In the differential case 2, as shown in FIGS. 5, 7, 8, it is provided that side gear penetrating openings 12L, 12R positioned at equal distance apart from the pinion gear supporting portion 10, 11 in circumferential direction. In a left portion of the differential case 2, as shown in FIGS. 1 to 3, is provided a ring gear mounting flange 13 peripherally projected as a body with the differential case 2 in a perpendicular plane to the rotational axis O and the ring gear mounting flange 13 is a ring-like shape.

Figure 11:
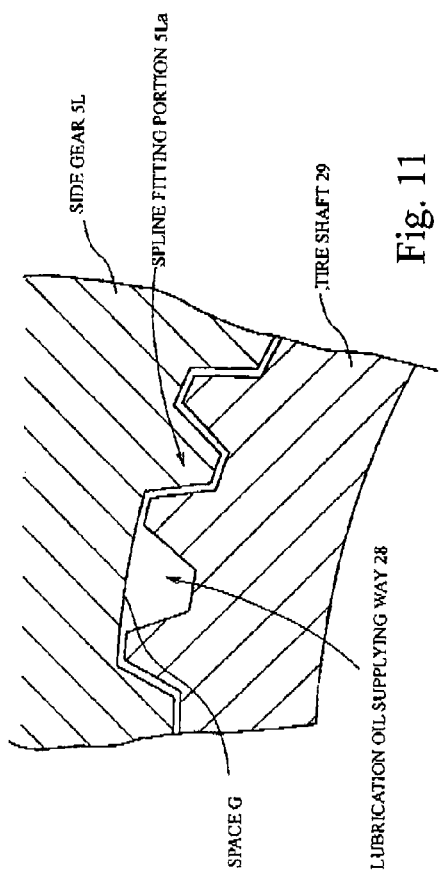
FIG. 11 is a cross sectional drawing showing a connected stage of a side gear and a tire shaft of a differential device for a vehicle according to one embodiment of the present invention.

The tire shaft inserted holes 9L, 9R are formed as an inner penetrating hole having a same inner diameter as shown in FIGS. 2, 3. In the tire shaft inserted holes 9L, 9R are respectively penetrated by each tire shaft in right and left positions, one of them is shown in FIG. 11. In a peripheral portion around an opening of the tire shaft inserted holes 9L, 9R are provided thrust washer receiving portions 9La, 9Ra receiving the thrust washer 6L, 6R and the thrust washer receiving portions 9La, 9Ra are formed as a spherical surface.

The pinion gear supporting portions 10, 11 provides pinion gear back holes 10A, 11A and extending portions 10B, 11B as shown in FIGS. 5, 8.

The pinion gear back holes 10A, 11A form notches 10d, 11d communicating with the lubrication oil reserving portion 30 as a step-like penetration hole as shown in FIG. 6A. These holes 10A, 11A function as a supporting hole and a machining hole for the pinion gears. Inner diameter sizes of the opening of the pinion gear back holes 10A, 11A are almost same as outer diameter sizes of the pinion gears 3, 4 and smaller than outer diameters of the side gears 5L, 5R. Inner surfaces of the pinion gear back holes 10A, 11A is the pinion gear supporting faces 10a, 11a supporting rotatably at least one portion of the first supported portions 3a, 4a of the pinion gears 3, 4 and the second supported portions 3b, 4b of the pinion gears 3, 4.

First step-like surfaces of the pinion gear back holes 10A, 11A are pinion gear receiving portions 10m, 10n being spherical surfaces of a predetermined radius to receive the pinion gears 3, 4 acted centrifugal force. Second step-like surfaces of the pinion gear back holes 10A, 11A are washer receiving portions 10C, 11C receiving washers 21, 22 performing as a closer. The washers 21, 22 are disposed, as shown in FIG. 5, 6, between back faces of pinion gears 3, 4 and the washer receiving portions 10C, 11C in order to close the pinion gear back holes 10A, 11A and to stop flow of lubrication oil acted centrifugal force. Thereby, lubrication oil in the differential case 2 is prevented to be flowed out of the differential case 2 through the pinion gear back holes 10A, 11A.

Figure 4:
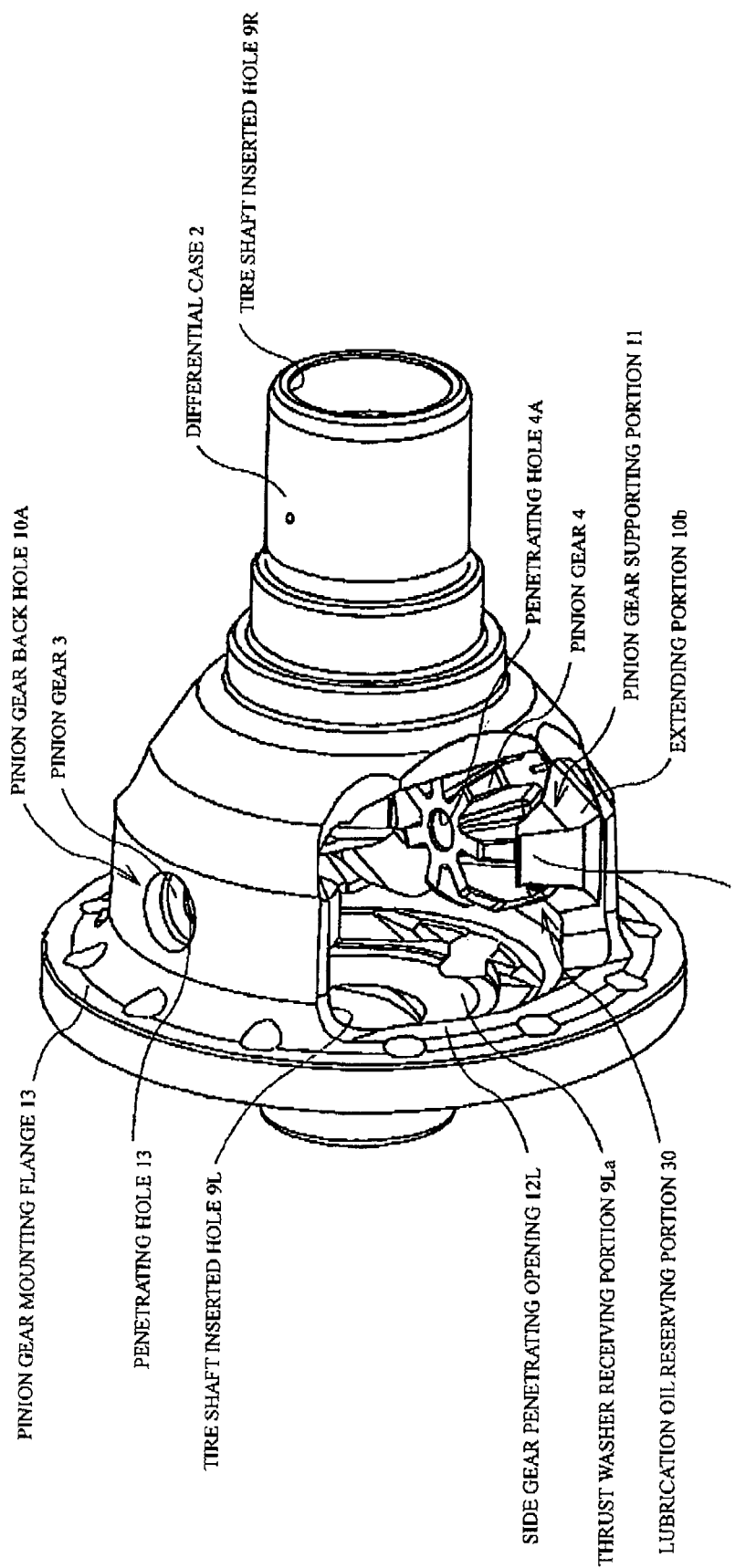
FIG. 4 is an oblique perspective diagram showing an assembling stage of pinion gears of a differential device for a vehicle according to one embodiment of the present invention.

In an inner peripheral portion around an opening of the pinion gear back holes 10A, 11A, as shown in FIG. 4, 5, 8, is formed as a body the extending portions 10B, 11B extending to the rotational axis O inside the differential case 2 to be positioned at same distances in parallel. On the extending portions 10B, 11B are provided the pinion gear supporting faces 10b, 11b adjacent to and in conjunction to the pinion gear supporting faces 10a, 11 to support a part of the first supported portions 3a, 4a of the pinion gear 3, 4 and to support the second supported portions 3b, 4b of the pinion gears 3, 4.

As shown in FIGS. 3 to 5, the side gear penetrating openings 12L, 12R are constructed with a hole having an opening with a non-circular shape in a plane. A size of this opening is enough to be inserted with the pinion gears 3, 4 and the side gears 5L, 5R into inside the differential case 2.

[Construction of the Pinion Gears 3, 4]

Since construction of the pinion gears 3, 4 are same each other, only the construction of the pinion gear 3 will be explained hereinafter. The pinion gear 3 is, as shown in FIG. 10A, 10B, a shaft-less cylindrical gear including the base portion B having an outer peripheral surface of a predetermined outer diameter and a gear portion C on which plural tongued teeth C1 and tooth grooves C2 are formed in one after the other. The pinion gear 3 is rotatably supported by the pinion gear supporting face 10a of the pinion gear back hole 10A (as shown in FIG. 6A) and the pinion gear supporting face 10b of the extending portion 10B (as shown in FIG. 5) without being supported by any shaft, that is the shaft-less construction as shown in FIG. 2.

Plural grooves 3C are provided in the pinion gears 3 to be opened to a part of the pinion gear supporting face 10b of the extending portion 10B and to the first supported portion 3a as a sliding face against the pinion gear supporting face 10a of the pinion gear back hole 10A in order to introduce the lubrication oil.

The plural grooves 3C are disposed in parallel at a predetermined space in a circumferential direction of the pinion gear 3. When the pinion gear 3 is revolved in orbital motion around the rotational axis O by the rotation of the differential case 2, the lubrication oil is pumped inside the differential case 2 and the plural grooves 3C introduce the lubrication oil between the first supported portion 3a of the pinion gear 3 and a part of the pinion gear supporting face 10b of the extending portion 10B and between the first supported portion 3a of the pinion gear 3 and the pinion gear supporting portion 10a of the pinion gear back hole 10A. Thereby, lubrication oil is sufficiently introduced into the sliding surface of the first supported portion 3a as the sliding surface of the pinion gear 3 to prevent from bonding of the first supported portion 3a. And also, the plural grooves 3C are formed longitudinally in parallel with a rotational axis of the pinion gear 3 to be opened to a pinion gear receiving side of the pinion gear supporting portion 10 and opened to a direction of rotational axis O of the differential case 2 in order to flow the lubrication oil from the side of the rotational axis O of the differential case 2 to the side of back yard of the pinion gear 3 by the centrifugal force at the revolution of the pinion gear 3.

As shown in FIGS. 10A, 10B, a penetrating hole 3A is provided in the pinion gear 3 to be opened in the rotating axis thereof. Thereby, the penetrating hole 3A functions for supplying the lubrication oil at the differential motion. And also, heat treatment can be performed not only on the peripheral surface but also on the inner surface of the penetrating hole 3A so that mechanical hardness of the pinion gear 3 is strengthen. More over, the penetrating hole 3A functions for centering in machining the pinion gear 3 and for inserting a supporting rod when the pinion gear 3 is stocked before assembling.

The base portion B is formed on a place of the pinion gear 3 except for an engagement portion with the side gears 5L, 5R at the opposite side to the side gear side. On the outer peripheral surface of the base portion B is formed the first supported portion 3a faced to the pinion gear supporting face 10a of the pinion gear back hole 10A and a part of the pinion gear supporting face 10b of the extending portion 10B. On the back face of the pinion gear 3 is provided a sliding portion 3B being a spherical surface fitting to the receiving portion 10m of the pinion gear back hole 10A as shown in FIGS. 10A, 10B.

As shown in FIGS. 10A, 10B, the gear portion C comprises a straight portion Cs including the second supported portion 3b of the pinion gear 3 and a taper portion Ct continuing from the straight portion Cs, and it is engaged with the side gears 5L, 5R in a side of the rotational axis O of the differential case 2. A tooth edge face C1c of the tongued gear C1 of the straight portion Cs is a peripheral face with a predetermined diameter. The tooth edge face C1c is a part of the tooth edge face of a gear engaging portion continuing to the peripheral surface of the base portion B. A tooth edge face C1c of the tongued gear C1 of the taper portion Ct is a peripheral face with a gradually smaller diameter from the gear base portion to the gear edge portion.

[Construction of the Side Gears 5L, 5R]

As shown in FIG. 2, the side gears 5L, 5R are almost ring gears having boss 10 portions 5La, 5Ra and gear portions 5Lb, 5Rb, each diameter of which is different each other. An outer diameter of the side gears 5L, 5R is larger than the outer diameter of the pinion gears 3, 4 and the side gears 5L, 5R are a bevel gear having a single conical angle. The side gears 5L, 5R are rotatably supported in the differential case 2 to engage with the pinion gears 3, 4. A number of teeth of the side gears 5L, 5R is more than 2.1 times as many numbers as one of teeth of the pinion gears 3, 4, for example, the number of gears of the side gears 5L, 5R is 15, compared that the number of teeth of the pinion gears 3, 4 is 7. The outer peripheral diameter of the side gears 5L, 5R is set larger than the outer diameter of the pinion gears 3, 4 and a distance between the two extending portions 10B and 11B.

On a back face of the side gears 5L, 5R are provided sliding portions 5Lc, 5Rc being a spherical surface to fit to the thrust washer receiving portions 9Lc, 9Rc of the differential case 2 through the thrust washers 6L, 6R. As shown in FIG. 11, each tire shaft 29 is individually inserted into the tire shaft inserted holes 9L, 9R with spline fitting. A space G is formed between the inner surface of the side gears 5L, 5R and the outer surface of the tire shaft 29 by absenting one tooth in the spline fitting portions 5Lc, 5Rc so that plural lubrication oil supplying ways 28 are formed with same pitch around the rotational axis O of the differential case 2. An axle spacer 23 is inserted between the side gears 5L, 5R, as shown in FIGS. 2, 3, for preventing a movement of the tire shafts.

Figure 12:
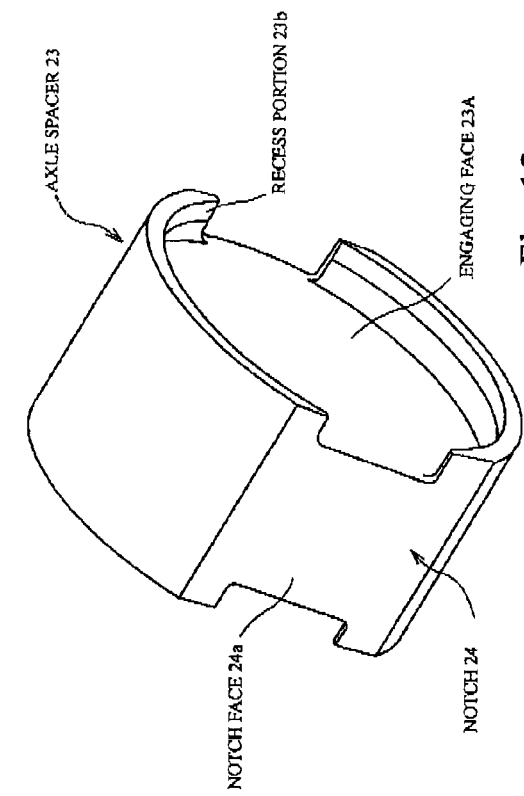
FIG. 12 is an oblique perspective diagram explaining a tire shaft movement restricting member of a differential device for a vehicle according to one embodiment of the present invention.

As shown mainly in FIG. 12, the axle spacer 23 has recess portions 23a, 23b fitting to nose portions of right and left tire shafts and is placed on the rotational axis O of the differential case 2. And the axle spacer 23 is almost cylindrical as a whole. Thereby, it is smoothly and certainly to connect side gears 5L, 5R and right/left tire shafts as a spline fit. An each end face of the recess portions 23a, 23b is an engaging face 23A, 23B engaging with the nose face of the tire shaft 29. Two large notches 24, 25 are provided in the axle spacer 23 to have notch faces 24a, 25a in parallel with the virtual plane including the axis of the axle spacer 23 as shown in FIG. 12 and also FIG. 3.

The space formed by the notches 24, 25 is communicated with the lubrication oil supplying way 28 and the notches 24, 25 are disposed in parallel and equal distances of the circumferential direction of the axle spacer 23. Therefore, the axle spacer 23 agitates lubrication oil at the rotation of the differential case 2. And also, the axle spacer 23 is constructed to supply lubrication oil inside the side gears 5L, 5R to the clearance between a part of the pinion gear supporting face 10b, 11b of the extending portions 10B, 11B and the pinion gear supporting face 10a, 11a of the pinion gear back holes 10A, 11A. Thereby, lubrication oil is sufficiently supplied to the first supported portions 3a, 3b of the pinion gears 3, 4. The lubrication oil is pumped from outside the differential case 2 through a clearance between the inner surface of the tire shaft inserted holes 9L, 9R and the outer surface of the tire shaft 29 and through the lubrication oil supplying way 28 into inside the differential case 2 so that the amount of lubrication oil into the first supported portions 3a, 4a of the pinion gears 3, 4 can be increased by the notches 24, 25.

[Construction of the Thrust Washers 6L, 6R]

As shown in FIGS. 1 to 3, the thrust washers 6L, 6R are constructed as a ring washer having washer bodies 6La, 6Ra to receive side thrust force from the side gears 5L, 5R and are inserted into a space between a back face of the side gears 5L, 5R and the thrust washer receiving portion 9Lc, 9Rc. And thrust washers 6L, 6R are constructed to adjust the engagement of side gears 5L, 5R and the pinion gears 3, 4. On a peripheral edge of the thrust washers 6L, 6R are formed as a whole hanging and fixing pieces 26, 27 with a shape of hammer head being placed in parallel and equal distances in a circumferential direction. The hanging and fixing pieces 26, 27 are deformable in plastic deformation.

The hanging and fixing pieces 26, 27 are deformed in plastic to be fixed to the outer peripheral surface of the side gears 5L, 5R as shown in FIG. 3 and they are disposed in a place to allow the rotation of the side gears 5L, 5R. And they are constructed to prevent from displacement in radial direction of the thrust washers 6L, 6R against the side gears 5L, 5R. Thereby, the thrust washers 6L, 6R become one piece with the side gears 5L, 5R by fixing the hanging and fixing pieces 26, 27 in plastic deformation so that there is no need to compensate possible displacement of the thrust washers 6L, 6R in radial direction when the tire shafts 29 are assembled into the side gears 5L, 5R, resulting reductions of numbers of process at the connections of the tire shafts to achieve simplicity of assembling of the tire shafts and reductions of cost. Thickness of the hanging and fixing pieces 26, 27 is determined to be smaller than that of the washer bodies 6La, 6Ra. Thereby, the hanging and fixing pieces 26, 27 are easily deformable in plastic so that it is easy to assemble the thrust washer 6L, 6R on the side gears 5L, 5R. Besides, the hanging and fixing pieces 26, 27 may be eliminated after assembling because it is needless after connection of the tire shaft 29 on the side gears 5L, 5R.

[Operation of the Differential Device for the Vehicle]

First of all, when torque from the engine of the vehicle is input to the differential case 2 through the drive pinion and the ring gear, the differential case 2 is rotated around the rotating axis O. Upon the rotation of the differential case 2, rotational force is transferred to the pinion gears 3, 4 and to the side gears 5L, 5R through the pinion gears 3, 4. Because the right and left side gears 5L, 5R are engaged with the tire shaft 29 in spline fitting, torque from the engine is transmitted to the right and left tire shafts 29 through the drive pinion, the ring gear, the differential case 2, the pinion gears 3, 4, the side gears 5L, 5R. Upon the rotation of the differential case 2, lubrication oil is over the pinion gears 3, 4 and the pinion gear supporting portions 10, 11 as explained in next items 1. to 4.

1. As shown in FIG. 13, since it is constructed that the lubrication oil introducing portions 7, 8 (referred to FIG. 5) including projections 7a, 8a are provided in the differential case 2, lubrication oil L is reserved in the space 7b, 8b by being scattered or introduced based on centrifugal force or gravity when the differential case 2 is rotated. Then, lubrication oil L in the space 7b, 8b is mixed up by the projections 7a, 8a to be introduced to the clearance between the sliding face of the pinion gears 3, 4 and the pinion gear supporting face of the pinion gear supporting portions 10, 11. Said sliding portions of the pinion gears 3, 4 are first supported portions 3a, 4a of the base portion B and second supported portions 3b, 4b of the gear portion C. Said pinion gear supporting faces are pinion gear supporting faces 10a, 11a of the pinion gear back holes 10A, 11A and pinion gear supporting faces 10b, 11b of extending portions 10B, 11B. Thereby, sufficient lubrication is performed at first supported portions 3a, 4a of the base portion B and second supported portions 3b, 4b of the gear portion C, and also at pinion gear supporting faces 10a, 11a of the pinion gear back holes 10A, 11A and pinion gear supporting faces 10b, 11b of extending portions 10B, 11B so that it is preventing from bonding on the gear peripheral portion of the pinion gears 3, 4.

When the differential case 2 is rotated, the rotation of the projections 7a, 8a of the lubrication oil introducing portions 7, 8 acts as a fin for discharging a frictional heat to lubrication oil where the frictional heat is generated between the first supported portions 3a, 4a of the base portion B and a part of the pinion gear supporting faces 10a, 11a and also between the first supported portions 3a, 4a of the base portion B and the pinion gear supporting face 10a, 11a of the pinion gear back holes 10A, 11A.

2. Since the lubrication oil reserving portion 30 is constructed as a circular recess on all peripheral inner surface of the differential case 2 around the rotational axis O, lubrication oil is reserved in the lubrication oil reserving portion 30 by centrifugal force when the differential case 2 is rotated. The first supported portion 3a, 4a is lubricated by lubrication oil from the lubrication oil reserving portion 30 through the notches 10d, 11d.

3. Since plural grooves 3C are provided in the pinion gears 3 to be opened to a part of the pinion gear supporting faces 10b, 11b of the extending portions 10B, 11B and to the first supported portions 3a, 4a as a sliding face against the pinion gear supporting faces 10a, 11a of the pinion gear back holes 10A, 11A, lubrication oil is introduced into plural grooves 3C to place lubrication oil in the clearance between the first supported portion 3a, 4a of the pinion gear 3, 4 and a part of the pinion gear supporting faces 10b, 11b of the extending portions 10B, 11B and also the clearance between the first supported portion 3a, 4a of the pinion gear 3, 4 and the pinion gear supporting faces 10a, 11a of the pinion gear back holes 10A, 11A. Since the plural grooves 3C are formed longitudinally in parallel with a rotational axis of the pinion gear 3 to be opened to the pinion gear receiving side of the pinion gear back holes 10A, 11A and opened to the direction of rotational axis O of the differential case 2, lubrication oil is flowed from the side of the rotational axis O of the differential case 2 to the first received portions 3a, 4a of the pinion gears 3, 4 after flowing into the plural grooves 3C by the centrifugal force at the revolution of the pinion gear 3.

4. Since two large notches 24, 25 are provided in the axle spacer 23 existing between both side gears 5L and 5R to have notch faces 24a, 25a in parallel with the virtual plane including the axis of the axle spacer 23, lubrication oil in the side gears 5L, 5R is sufficiently supplied to the clearance between a part of the pinion gear supporting face 10b, 11b of the extending portions 10B, 11B and the pinion gear supporting face 10a, 11a of the pinion gear back holes 10A, 11A. And also, since the space G is formed on the spline fitting portions 5Lc, 5Rc because of the lack of the tooth or teeth between the inner surface of the side gears 5L, 5R and the outer surface of the tire shaft 29 to generate the lubrication oil supplying way 28, lubrication oil is pumped from outside the differential case 2 through the clearance between the inner surface of the tire shaft inserted holes 9L, 9R and the outer surface of the tire shaft 29 and through the lubrication oil supplying way 28 into inside the differential case 2 so that the amount of lubrication oil into the first supported portions 3a, 4a of the pinion gears 3, 4 can be increased by the notches 24, 25.

Where each load acting on each tire on the right and left tire shafts is equal, the pinion gears 3, 4 is revolved on the side gears 5L, 5R and the pinion gears 3, 4 and the side gears 5L, 5R are rotated as a body around the rotational axis O so that torque from the engine is transmitted equally to right and left tire shafts to rotate each tire at same rotational speed.

Where the vehicle turns left or the right wheel drops into a muddy ground, the pinion gears 3, 4 are rotated around its own axis with engagement with the side gears 5L, 5R so that torque from the engine is distributed differently to the right and left tires. In actual, the left tire is rotated at lower speed than the speed of the differential case 2 and the right tire is rotated at higher speed than the speed of the differential case 2.

Where the pinion gears 3, 4 are rotated around its own axis during torque is actuated to the differential case 2, the pinion gears 3, 4 slide on the first pinion gears supporting face 10a, 11a and second pinion gear supporting face 14a, 15a so that frictional resistance occurs on the first pinion gear supporting face 10a, 11a and second pinion gear supporting face 14a, 15a. Therefore, the differential rotation of the side gears 5L, 5R is restricted by the frictional resistance.

By this rotation of the pinion gears 3, 4 around its axis, thrust force is occurred on the engagement surface with the side gears 5L, 5R to the rotational direction. Each of the side gears 5L, 5R is moved to be separated each other by the thrust force to push the thrust washers 6L, 6R in contact with the thrust washer receiving portions 9Lc, 9Rc so that frictional resistance is occurred between the thrust washers 6L, 6R and the thrust washer receiving portions 9Lc, 9Rc. Therefore, the differential rotation of the side gears 5L, 5R is also restricted by this second frictional resistance. And also, the sliding portions 3B, 4B are pushed in contact with the pinion gear receiving portions 10m, 10n by the thrust resistance occurred on the pinion gears 3, 4 so that frictional resistance is occurred against the rotation of the pinion gears 3, 4 around its own axis. Therefore, the differential rotation of the side gears 5L, 5R is also restricted by this third frictional resistance.

Next, an assembling method of the differential device for the vehicle according to the embodiment of the present invention will be explained hereinafter. The assembling method of the differential device for the vehicle according to the embodiment is performed in order of each step of "assemble of pinion gear", "assemble of side gear" and "engagement of pinion gear and side gear" so that each step will be explained in order.

"Assemble of Pinion Gear"

After the pinion gears 3, 4 are inserted into the differential case 2 through the side gear penetrating openings 12L, 12R, the sliding portions 3B, 4B of the pinion gears 3, 4 are supported by the pinion gear supporting portion 10, 11 in contact with the pinion gear receiving portions 10m, 10n to be installed in a predetermined position inside the differential case 2.

"Assemble of Side Gear"

Each of side gears 5L, 5R is inserted into the differential case 2 in sliding from the different direction each other along the thrust washer receiving portions 9Lc, 9Rc to coincide each gear axis with the rotational axis to be installed in a predetermined position inside the differential case 2.

"Engagement of Pinion Gear and Side Gear"

After the thrust washers 6L, 6R are inserted between the sliding portions 5La, 5Ra of the side gears 5L, 5R and the thrust washer receiving portions 9Lc, 9Rc with adjustment of a length between the thrust washer receiving portions 9Lc, 9Rc and the side gears 5L, 5R, the thrust washers 6L, 6R are hanged on the peripheral portion of the side gears 5L, 5R after plastic deformation of the hanging and fixing pieces 26, 27. When the thrust washers 6L, 6R are inserted between the side gears 5L, 5R and the thrust washer receiving portions 9Lc, 9Rc, the side gears 5L, 5R are engaged with the pinion gears 3, 4. Then, the axle spacer 23 is inserted between the side gears 5L and 5R at the engagement of the pinion gears 3, 4 and the side gears 5L, 5R in order to perform smoothly and stably the connection of the side gears 5L, 5R and the tire shaft 29 in spline engagement.

Another Embodiment

Figure 14:
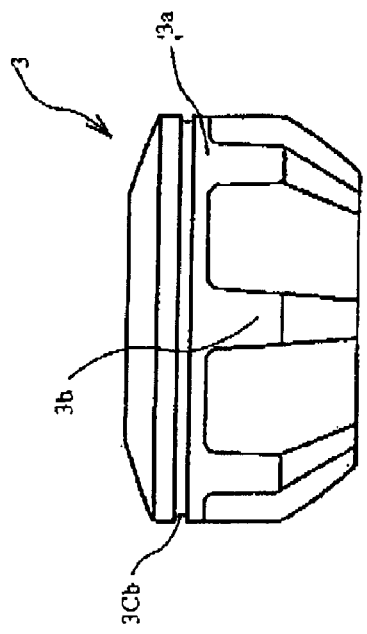
FIG. 14 to FIG. 16 are a front drawing explaining a pinion gear according to another embodiment of the present invention.
Figure 15:
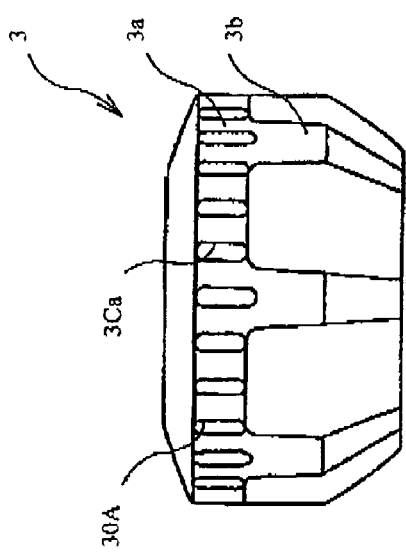

In previously explained one embodiment of the present invention, one of the lubrication oil introducing portion is explained as plural grooves 3C formed parallel to the own rotational axis of the plural pinion gears 3, 4 perpendicular to the rotational axis of the differential case 2, a number of plural grooves 3C may be plural grooves 3Ca as shown in FIG. 14 to be more than that shown in FIG. 10. In other embodiment of the present invention, as shown in FIG. 15, plural grooves 3C are single circular groove 3Cb formed around the own rotational axis to introduce lubrication oil to all facing area of the pinion gear supporting face 11a to the first supported portions 3a, 4a of the pinion gears 3, 4.

Figure 16:
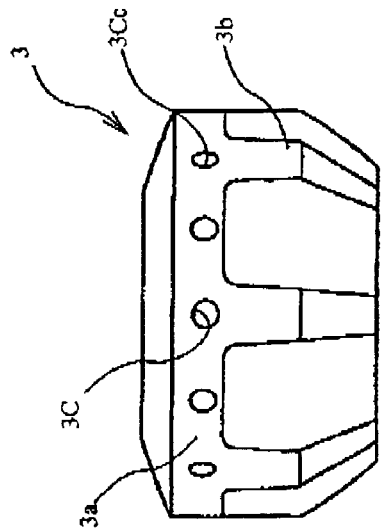

In another embodiment of the present invention, plural grooves 3C are plural recesses 3Cc formed on a peripheral surface of the plural pinion gears 3, 4 around a rotational axis of the plural pinion gears 3, 4 perpendicular to the rotational axis of said differential case 2, as shown in FIG. 16. These plural grooves 3C, 3Ca, 3Cb or plural recesses 3Cc may be formed not on the peripheral surface of the pinion gears 3, 4 but on the pinion gear supporting face 10a, 10b, 11a, 11b. Two examples of this case will be explained hereinafter as another embodiment of the present invention.

Figure 17:
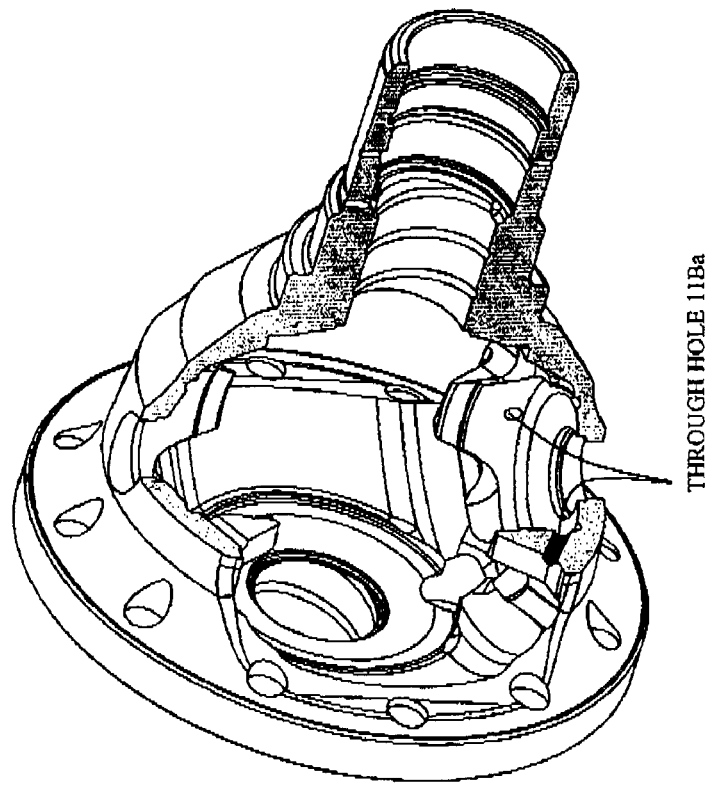
FIG. 17 is an oblique perspective diagram explaining a lubrication oil introducing portion of a differential case of a differential device for a vehicle according to another embodiment of the present invention.

In further another embodiment of the present invention, one of the lubrication oil introducing portion is, as shown in FIG. 17, a through hole 11Ba formed on the extending portion 10B, 11B to flow lubrication oil into a sliding face of the pinion gear supporting faces 10a, 10b, 11a, 11b of said pinion gear supporting portions 10, 11 in order to introduce positively lubrication oil to the supporting surface.

Figure 18:
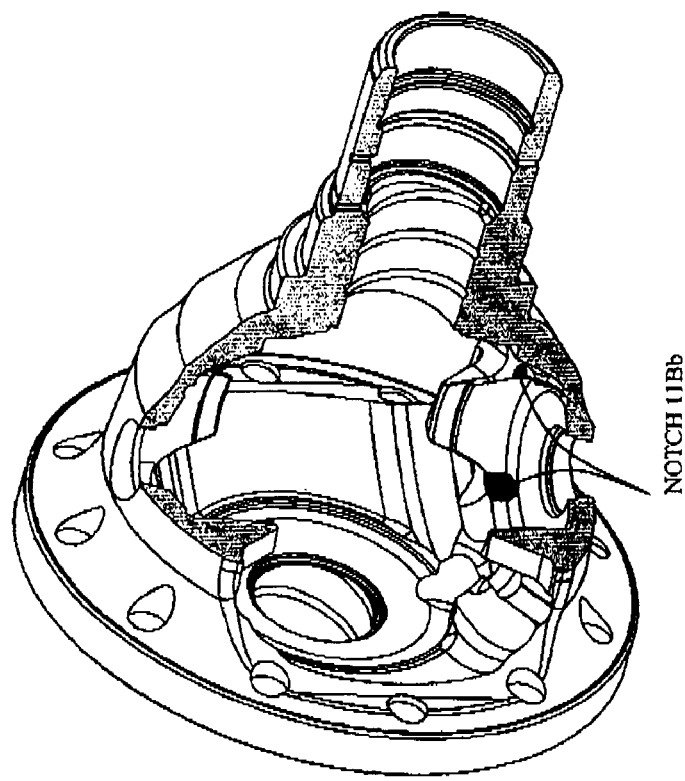
FIG. 18 is an oblique perspective diagram explaining a lubrication oil introducing portion of a differential case of a differential device for a vehicle according to more another embodiment of the present invention.

In more another embodiment of the present invention, one of the lubrication oil introducing portion is, as shown in FIG. 18, a pair of notches 11Bb formed on said pinion gear supporting portion 10, 11 parallel to the own rotational axis of the plural pinion gears 3, 4 at both side of said extending portion 10B, 11B to flow lubrication oil into a sliding face of the pinion gear supporting face of said pinion gear supporting portions 10, 11 in order to introduce lubrication oil to the pinion gear supporting portions 10, 11 to prevent from bonding in burn or friction.

While the invention has been described in detail with reference to the preferred embodiment, it will be apparent to those skilled in the art that the invention is not limited to the present embodiment, and that the invention may be realized in various other embodiments within the scope of the claims.

While the embodiment of the present invention is described that the lubrication oil introducing portions 7, 8 are explained to be installed at both side of the plural pinion gears 3, 4 from inner surface of the differential case 2 toward the rotational axis of said differential case 2, it may be installed at one side of the plural pinion gears 3, 4 toward the rotational axis of said differential case 2 so that it can prevent from bonding in burn in the peripheral surface of the plural pinion gears 3, 4 and also that frictional heat generated between the first supported portion 3a, 4a and one of the pinion gear supporting portions 10b, 11b of the extending portions 10B, 11B and also between the first supported portion 3a, 4a and the pinion gear supporting portions 10a, 11a of the pinion gear back holes 10A, 11A can be discharged into lubrication oil.

While the embodiment of the present invention is described that the differential case 2 is one peace of the differential case, but it may be constructed by plural peaces of the differential case.

While the embodiment of the present invention is described that the plural pinion gears 3, 4 engaging with the side gears 5L, 5R is two pinion gears, but it may be constructed by three or more pinion gears in the differential case 2 by the way of smaller diameter of the pinion gear.

What is claimed is:

1. A differential case for a vehicle, comprising:
   plural pinion gear supporting portions supporting individually and slidably plural pinion gears; and
   a lubrication oil introducing portion provided around a peripheral portion of said plural pinion gears to introduce lubrication oil into a clearance between sliding faces of said plural pinion gears and pinion gear supporting faces of said plural pinion gear supporting portions,
   wherein said plural pinion gear supporting portions include an extending portion extending at both sides of said plural pinion gears from an inner surface of said differential case toward a rotational axis of said differential case to support slidably a part of at least a gear engaging portion of said plural pinion gears.

2. A differential case for a vehicle according to claim 1, wherein said lubrication introducing portion includes a projection extending from said pinion gear supporting face of said extending portions toward said rotational axis of said differential case to mix up lubrication oil by a rotation of said differential case.

3. A differential case for a vehicle according to claim 1, wherein said lubrication oil introducing portion includes plural grooves formed on a peripheral surface of said plural pinion gears in parallel with a rotational axis of said plural pinion gears perpendicular to said rotational axis of said differential case to flow said lubrication oil from a side of said rotational axis of said differential case to a back side of said plural pinion gears.

4. A differential case for a vehicle according to claim 1, wherein said lubrication oil introducing portion includes a circular groove formed on a peripheral surface of said plural pinion gears around a rotational axis of said plural pinion gears perpendicular to said rotational axis of said differential case.

5. A differential case for a vehicle according to claim 1, wherein said lubrication oil introducing portion includes plural recesses formed on a peripheral surface of said plural pinion gears around a rotational axis of said plural pinion gears perpendicular to said rotational axis of said differential case.

6. A differential case for a vehicle according to claim 1, wherein said lubrication oil introducing portion includes a notch formed on a part of said plural pinion gear supporting portions to communicate with a lubrication oil reserving portion reserving said lubrication oil.

7. A differential case for a vehicle according to claim 6, wherein said lubrication oil reserving portion is formed as a circular recess on all said peripheral inner surface of said differential case around said rotational axis of said differential case perpendicular to said rotational axis of said plural pinion gears.

8. A differential case for a vehicle according to claim 1, wherein said lubrication introducing portion includes a through hole formed on said extending portion to flow said lubrication oil into a sliding face of a pinion gear supporting face of said pinion gear supporting portion.

9. A differential case for a vehicle according to claim 1, wherein said lubrication introducing portion includes a pair of notches formed on said pinion gear supporting portion parallel to said rotational axis at both sides of said extending portion to flow said lubrication oil into a sliding face of a pinion gear supporting face of said pinion gear supporting portion.

10. In a differential device for a vehicle including:

plural pinion gears;

a pair of side gears engaging with said plural pinion gears; and a differential case installing rotatably said plural pinion gears and said pair of side gears;

said differential case comprising:

plural pinion gear supporting portions supporting individually and slidably plural pinion gears; and a lubrication oil introducing portion provided around a peripheral portion of said plural pinion gears to introduce lubrication oil into a clearance between sliding faces of said plural pinion gears and pinion gear supporting faces of said plural pinion gear supporting portions, wherein said plural pinion gear supporting portions include an extending portion extending at both sides of said plural pinion gears from an inner surface of said differential case toward a rotational axis of said differential case to support slidably a part of at least a gear engaging portion of said plural pinion gears.

11. A differential device for a vehicle according to claim 10, wherein said plural pinion gears are shaft-less.

12. A differential device for a vehicle according to claim 11, wherein said lubrication introducing portion includes a projection extending from said pinion gear supporting face of said extending portions toward said rotational axis of said differential case to mix up lubrication oil by a rotation of said differential case.

13. A differential device for a vehicle according to claim 12, wherein said lubrication oil introducing portion includes plural grooves formed on a peripheral surface of said plural pinion gears in parallel with a rotational axis of said plural pinion gears perpendicular to said rotational axis of said differential case to flow said lubrication oil from a side of said rotational axis of said differential case to a back side of said plural pinion gears.

14. A differential device for a vehicle according to claim 11, wherein said lubrication oil introducing portion includes a notch formed on a part of said plural pinion gear supporting portions to communicate with a lubrication oil reserving portion reserving said lubrication oil, and said lubrication oil reserving portion is formed as a circular recess on all said peripheral inner surface of said differential case around said rotational axis of said differential case perpendicular to said rotational axis of said plural pinion gears.

15. A differential device for a vehicle according to claim 14, wherein said lubrication oil reserving portion is communicated with a lubrication oil supplying way formed between an inner surface of said pair of side gears and an outer surface of a tire shaft.

16. A differential device for a vehicle according to claim 11, wherein said lubrication introducing portion includes a through hole formed on said extending portion to flow said lubrication oil into a sliding face of a pinion gear supporting face of said pinion gear supporting portion.

17. A differential device for a vehicle according to claim 11, wherein said lubrication introducing portion includes a pair of notches formed on said pinion gear supporting portion parallel to said rotational axis at both sides of said extending portion to flow said lubrication oil into a sliding face of a pinion gear supporting face of said pinion gear supporting portion.

18. In a differential device for a vehicle, including:

plural shaft-less pinion gears;

a pair of side gears engaging with said plural pinion gears; and a differential case installing rotatably said plural pinion gears and said pair of side gears;

said differential case comprising:

plural pinion gear supporting portions supporting individually and slidably plural pinion gears; and a lubrication oil introducing portion provided around a peripheral portion of said plural pinion gears to introduce lubrication oil into a clearance between sliding faces of said plural pinion gears and pinion gear supporting faces of said plural pinion gear supporting portions;

said plural pinion gear supporting portions include an extending portion extending at both side of said plural pinion gears from inner surface of said differential case toward a rotational axis of said differential case to support slidably a part of at least a gear engaging portion of said plural pinion gears, said lubrication introducing portion comprises a projection extending from said pinion gear supporting face of said extending portions toward said rotational axis of said differential case to mix up lubrication oil by a rotation of said differential case;

a notch formed on a part of said plural pinion gear supporting portions; and a lubrication oil reserving portion communicating with said notch and being formed as a circular recess on all said peripheral inner surface of said differential case around said rotational axis of said differential case perpendicular to said rotational axis of said plural pinion gears to reserve lubrication oil.

\* \* \* \* \*